US012687428B2

(12) United States Patent  (10) Patent No.: US 12,687,428 B2
Woods et al.  (45) Date of Patent: Jul. 21, 2026

(54) SAMPLE CLAMP FOR A SPECTROSCOPIC INSTRUMENT

(71) Applicant: Thermo Scientific Portable Analytical Instruments Inc., Tewksbury, MA (US)

(72) Inventors: Sue Woods, Sutton, MA (US); Katelyn Benson, Tewksbury, MA (US); Brandon Fisher, Boston, MA (US); Nimesh Khadka, Dracut, MA (US)

(73) Assignee: Thermo Scientific Portable Analytical Instruments Inc., Tewksbury, MA (US)

( * ) Notice: Subject to any disclaimer, the term of this patent is extended or adjusted under 35 U.S.C. 154(b) by 104 days.

(21) Appl. No.: 18/584,447

(22) Filed: Feb. 22, 2024

(65) Prior Publication Data

US 2024/0288305 A1     Aug. 29, 2024

Related U.S. Application Data

(60) Provisional application No. 63/486,693, filed on Feb. 24, 2023.

(51) Int. Cl.
G01J 3/02       (2006.01)
G01J 3/44       (2006.01)

(52) U.S. Cl.
CPC ........... G01J 3/0202 (2013.01); G01J 3/0208 (2013.01); G01J 3/44 (2013.01)

(58) Field of Classification Search
CPC ......................................................... B01L 9/50
See application file for complete search history.

(56) References Cited

U.S. PATENT DOCUMENTS

| | | | |
|---|---|---|---|
| 2,835,252 A | 5/1958 | Bertram | |
| 4,834,352 A * | 5/1989 | Thornton | ................ B25B 5/163 |
| | | | 269/254 R |
| 8,319,182 B1 | 11/2012 | Brady et al. | |
| 8,881,980 B2 | 11/2014 | Magill | |

(Continued)

FOREIGN PATENT DOCUMENTS

| | | |
|---|---|---|
| EP | 0467804 A1 | 1/1992 |
| EP | 0781990 A1 | 7/1997 |

(Continued)

OTHER PUBLICATIONS

PCT/US2024/016872, International Search Report and Written Opinion, Jul. 2, 2024, 13 pages.

*Primary Examiner* — Thanh Luu

(57) ABSTRACT

A sample clamp as well as systems incorporating the sample clamp with a spectrometer and methods of using these systems are described. The sample clamp includes a first jaw connected to a second jaw by a hinge oriented in the direction of a first axis. The sample claim also includes a substantially cylindrical space oriented longitudinally in the direction of the first axis, defined by a first inner surface of the first jaw and a second inner surface of the second jaw, and configured for clamping a cylindrical object therein. Additionally, the sample clamp includes a conduit oriented in the direction of a second axis and optically connecting the cylindrical space to a first outer surface of the first jaw.

16 Claims, 10 Drawing Sheets

(56)                    References Cited

U.S. PATENT DOCUMENTS

| | | | |
|---|---|---|---|
| 2008/0000671 A1* | 1/2008 | Bratt | H02G 3/32 |
| | | | 174/135 |
| 2019/0072481 A1 | 3/2019 | Simpkin et al. | |
| 2020/0158653 A1 | 5/2020 | Truex | |

FOREIGN PATENT DOCUMENTS

| | | | |
|---|---|---|---|
| JP | 2002286717 A | 10/2002 | |
| JP | 2014206509 A | 10/2014 | |

\* cited by examiner

SAMPLE CLAMP FOR A SPECTROSCOPIC INSTRUMENT

CROSS-REFERENCE TO RELATED APPLICATIONS

This application claims priority to U.S. application No. 63/486,693, filed Feb. 24, 2023, which disclosure is herein incorporated by reference in its entirety.

FIELD OF THE INVENTION

This invention is directed to a holder for a sample. In particular, a holder designed to clamp a cylindrical object such as a sample container and couple to a spectrometer is described.

BACKGROUND OF THE INVENTION

Specialized containers such as cuvettes and vials are designed to match sample holders for spectroscopic instruments. These sample holders are designed with little tolerance for variability in shape and size of the containers. However, samples are often contained or provided in containers of different sizes such as vials, syringes, and tubes, which usually do not fit in the known sample holders. Therefore, the samples must be transferred to the specialized containers prior to analysis by the spectroscopic instruments. This is inefficient and increases the likelihood of contamination, spills, human exposure, or breaking of a container.

There is therefore an unmet need for a versatile sample holder that can accommodate cylindrical objects.

SUMMARY

Systems, methods, and products to address these and other needs are described herein with respect to illustrative, non-limiting, implementations. Various alternatives, modifications and equivalents are possible.

According to a first aspect a sample clamp is described. The sample clamp includes a first jaw connected to a second jaw by a hinge oriented in a direction of a first axis. The sample claim also includes a substantially cylindrical space oriented longitudinally in the direction of the first axis, defined by a first inner surface of the first jaw and a second inner surface of the second jaw, and configured for clamping a cylindrical object therein. Additionally, the sample clamp includes a conduit oriented in a direction of a second axis and optically connecting the cylindrical space to a first outer surface of the first jaw.

According to a second aspect, a system for analysis of a cylindrical object is described. The system includes a spectrometer and the sample clamp according to the first aspect.

According to a third aspect, a method of analyzing a cylindrical object is described. The method includes clamping the cylindrical object in the cylindrical space of the sample clamp system according to the second aspect; sending excitation light from the spectrometer through the conduit and into the cylindrical object; directing a sample light from the sample through the conduit to the spectrometer; and analyzing the sample light using the spectrometer.

The sample clamp provides a versatile sample holder that can accommodate cylindrical objects with different diameters that can be attached to and used with a spectrometer, such as a handheld Raman spectrometer.

BRIEF DESCRIPTION OF THE DRAWINGS

The foregoing and other features and advantages of the present embodiments will be more fully understood from the following detailed description of illustrative embodiments taken in conjunction with the accompanying drawings.

FIG. 1A is a 3D view of the sample clamp; FIG. 1B is a side view; FIG. 1C is the side view with the sample clamp opened.

FIG. 5A shows a sample clamped by the clamp. FIG. 5B shows the clamp in a closed position. FIG. 5C shows another implementation of the lip.

DETAILED DESCRIPTION

Figure 1A:
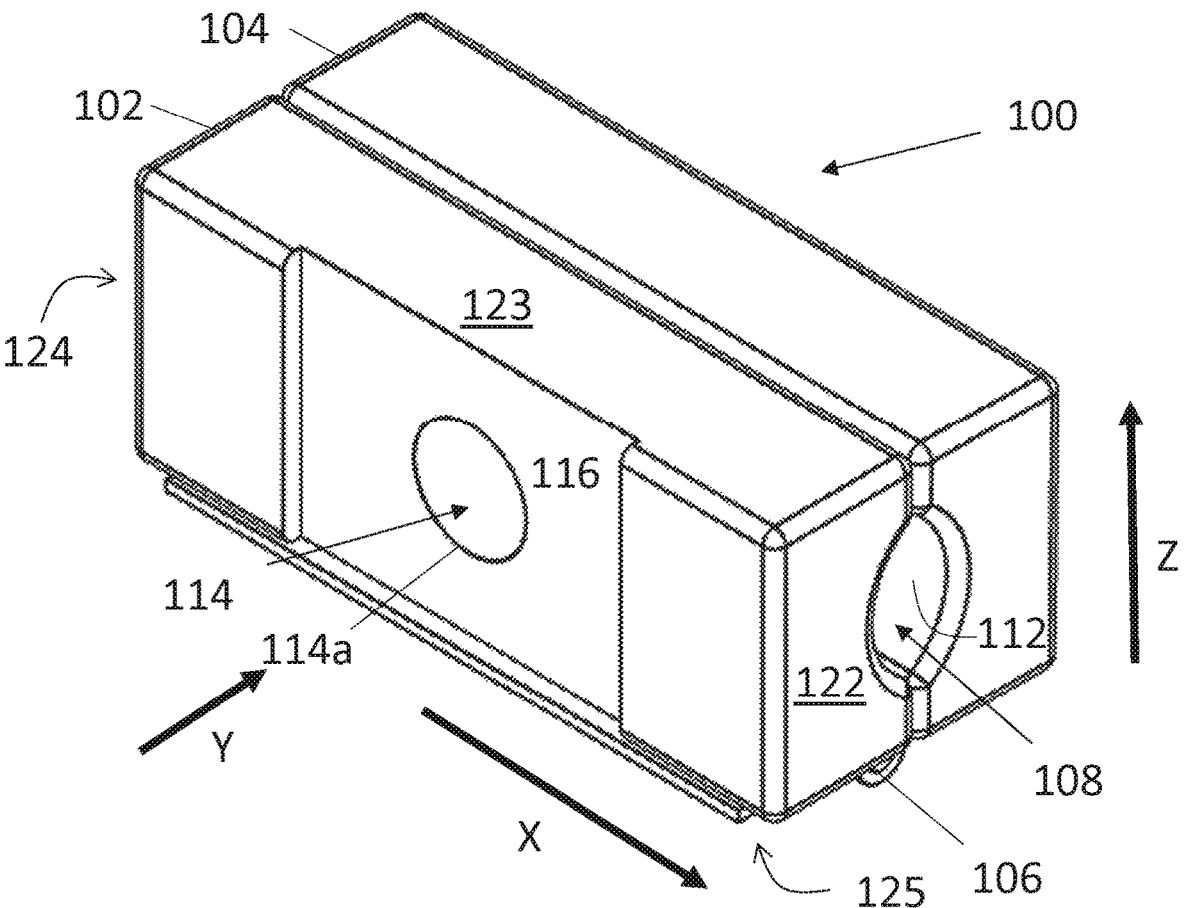
FIGS. 1A-1C are views of a sample clamp, according to some implementations.

In the description of the invention herein, it is understood that a word appearing in the singular encompasses its plural counterpart, and a word appearing in the plural encompasses its singular counterpart, unless implicitly or explicitly understood or stated otherwise. Furthermore, it is understood that for any given component or embodiment described herein, any of the possible candidates or alternatives listed for that component may generally be used individually or in combination with one another, unless implicitly or explicitly understood or stated otherwise. Moreover, it is to be appreciated that the figures, as shown herein, are not necessarily drawn to scale, wherein some of the elements may be drawn merely for clarity of the invention. Also, reference numerals may be repeated among the various figures to show corresponding or analogous elements. Additionally, it will be understood that any list of such candidates or alternatives is merely illustrative, not limiting, unless implicitly or explicitly understood or stated otherwise. In addition, unless otherwise indicated, numbers expressing quantities of ingredients, constituents, reaction conditions and so forth used in the specification and claims are to be understood as being modified by the term "about."

Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the statistical dispersion found in their respective testing measurements.

Figure 1B:
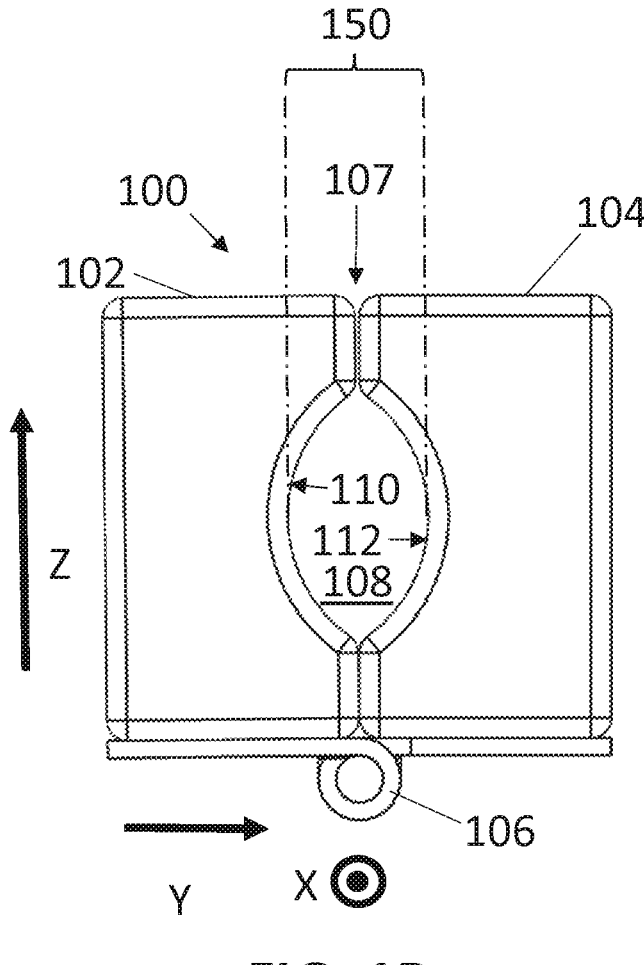
Figure 1C:
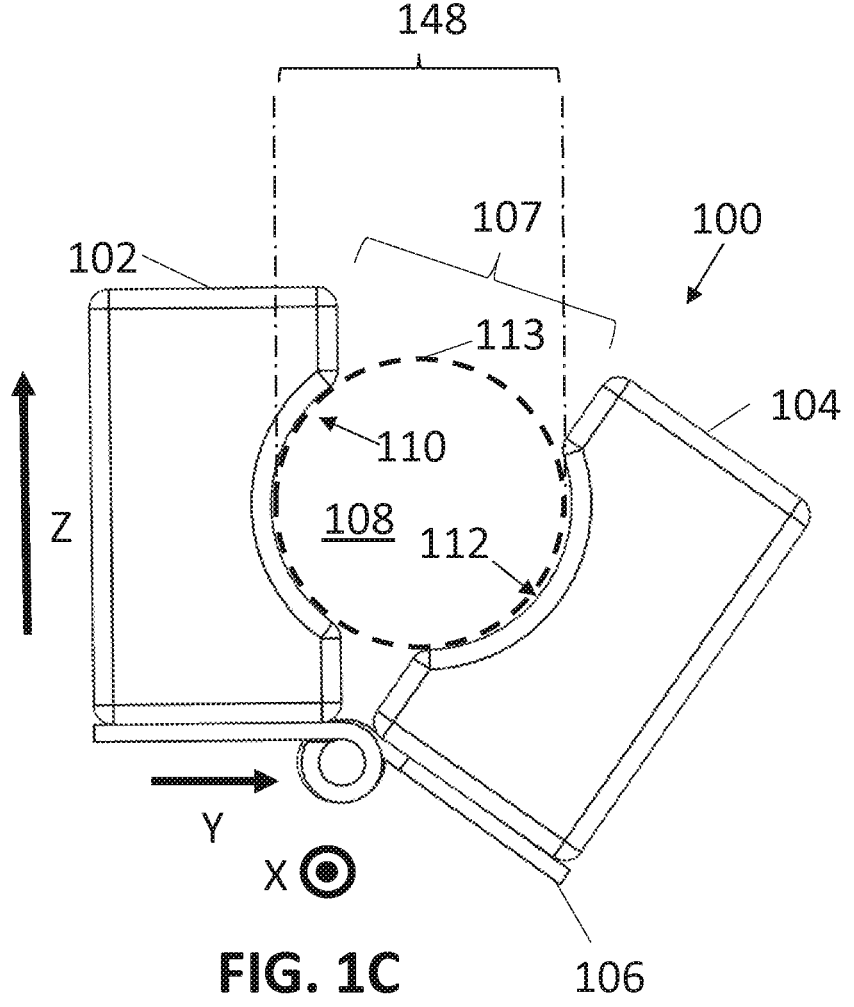

FIGS. 1A-1C are views of a sample clamp 100, according to some implementations. FIG. 1A is a 3D view of the sample clamp 100; FIG. 1B is a side view; and FIG. 1C is the side view with the sample clamp 100 opened. The cardinal axis X, a first axis, Y, a second axis, and Z are shown as arrows to aid in the depiction of the orientations. In FIGS. 1B and 1C the X axis is shown as an arrowhead pointing out of the page (circle with a center dot). Where possible, all elements are labeled in all the figures, however, where this is challenging, some elements may only be labeled in one or two of the figures.

The sample clamp 100 includes a first jaw 102 connected to a second jaw 104 by a hinge 106. The hinge 106 is oriented in the direction of the first axis X. The first jaw 102 and the second jaw 104 define a substantially cylindrical space 108 that is oriented longitudinally in the direction of the first axis X. The longitudinal direction as used herein refers to the direction of the height of a cylindrical object 113 or the direction of the height of the cylindrical space 108 (e.g., a syringe) rather than the circumference. The cylindrical space 108 is defined at least in part by a first inner surface 110 of the first jaw 102 and a second inner surface 112 of the second jaw 104, both of which are concave surfaces. The first inner surface 110 and second inner surface 112 each at least partially contact the cylindrical object 113 placed in the space 108 thereby clamping the cylindrical object 113. Accordingly, in some implementations, a diameter 148 (FIG. 1C) of the cylindrical object 113 is equal to or larger than a distance 150 between the first inner surface 110 and the second inner surface 112, when the sample clamp is in a closed position as shown in FIG. 1B. The cylindrical object 113 is depicted in FIG. 1C by a dashed line outline. As used herein, the substantially cylindrical space 108 can include any space that can accommodate an object with a cylindrical cross section, such as cylindrical object 113, where curvature of the first surface 110 and curvature of the second surface 112 can cradle the object. It is appreciated that other than perfectly cylindrical objects can be accommodated in the space 108. In some implementations, the cylindrical object compress and deform when they are clamped in the sample clamp 100.

The sample clamp 100 also includes a conduit or channel 114 that passes through the first jaw 102. The conduit 114 is oriented in the direction of the second axis Y and optically connects the cylindrical space 108 to a first outer surface 116 of the first jaw 102. In some implementations, the conduit is an open area or passage through the first jaw 102. An opening is indicated by the circular edge 114a in FIG. 1A. In some implementations, the conduit 114 includes a material that is transparent to light, such as window or a light pipe.

In some implementations, the conduit 114 is approximately equidistant (in the X direction) from a first end 122 and second end 124 of the first jaw 102. In some implementations, the conduit is equidistant (in the Z direction) from a top 123 and a bottom 125 of the first jaw 102.

In some implementations, such as depicted by FIGS. 1A-1C, the hinge includes leaves, knuckles, and a pin. The hinge can be integrated as a single part of each of the first jaw 102 and the second jaw 104. For example, the first jaw 102 with the leaf and knuckles of a first half of the hinge 106 can be cast, machined or 3D printed from a single material, and the second jaw 104 with the leaf and knuckles of a second half of the hinge can be cast, machined or 3D printed from a single material, and these can be connected by inserting a pin through the corresponding knuckles. Other implementations are also contemplated that can hingedly connect the first jaw 102 to the second jaw 104 so that the clamp 100 can open from the closed configuration depicted by FIG. 1B to the open configuration depicted in FIG. 1C. In some implementations, the hinge 106 is a flexible material or an elastic material. In some implementations, the hinge 106 is integrated with the first jaw 102 and the second jaw 104, such as a living hinge or integral hinge. In some implementations, the hinge is an eye and hook hinge.

In some implementations, the sample clamp 100 includes a tensioner, such as a spring integrated or added to the hinge 106 (e.g., a spring-loaded hinge). In some implementations, a tensioner is not included as an additional element such as where a hinge is made of an elastic or flexible material that is already tensioned to hold the clamp 100 in the closed position (e.g., closed as depicted in FIGS. 1A and 1B). In some implementations the tensioner can be an elastic material spanning the gap 107, which is small in FIG. 1B and large in FIG. 1C.

Figure 2:
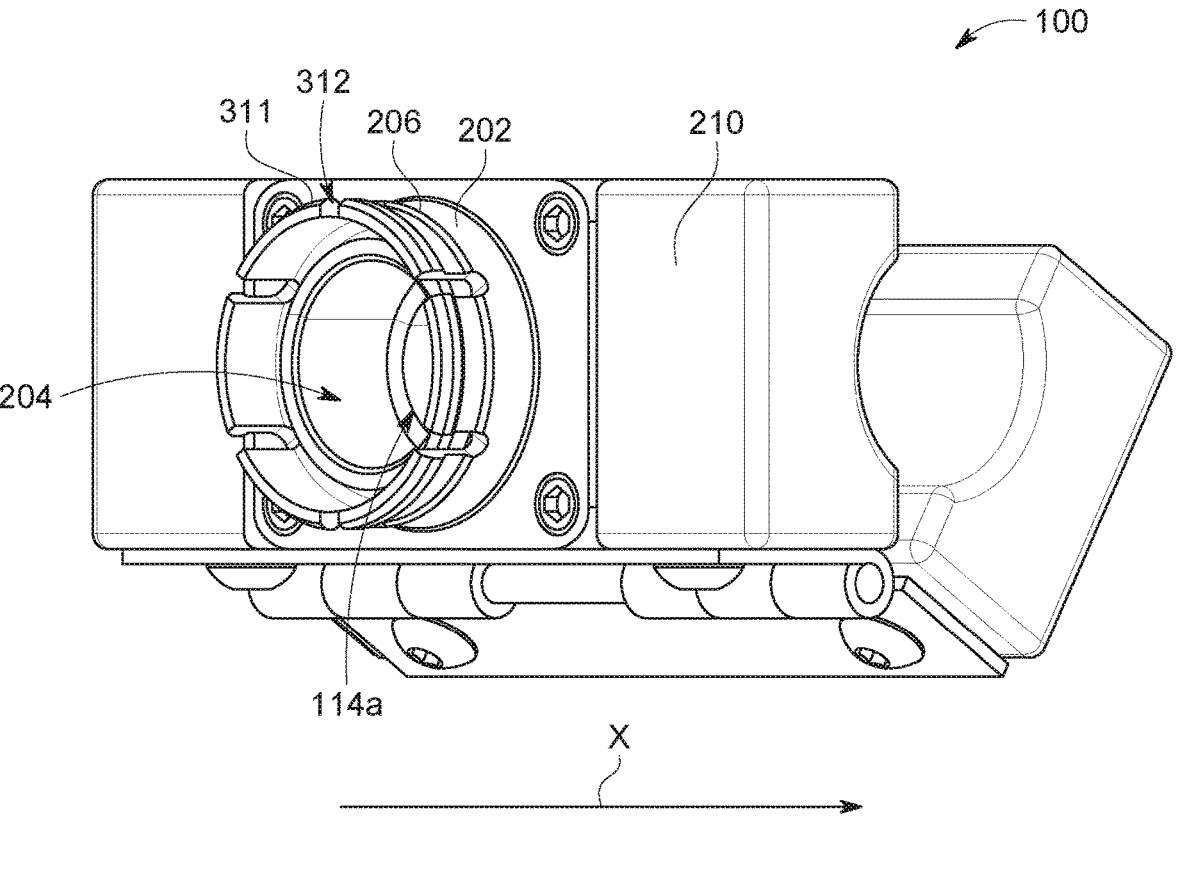
FIG. 2 is a 3D depiction of a sample clamp, according to some implementations.
Figure 3A:
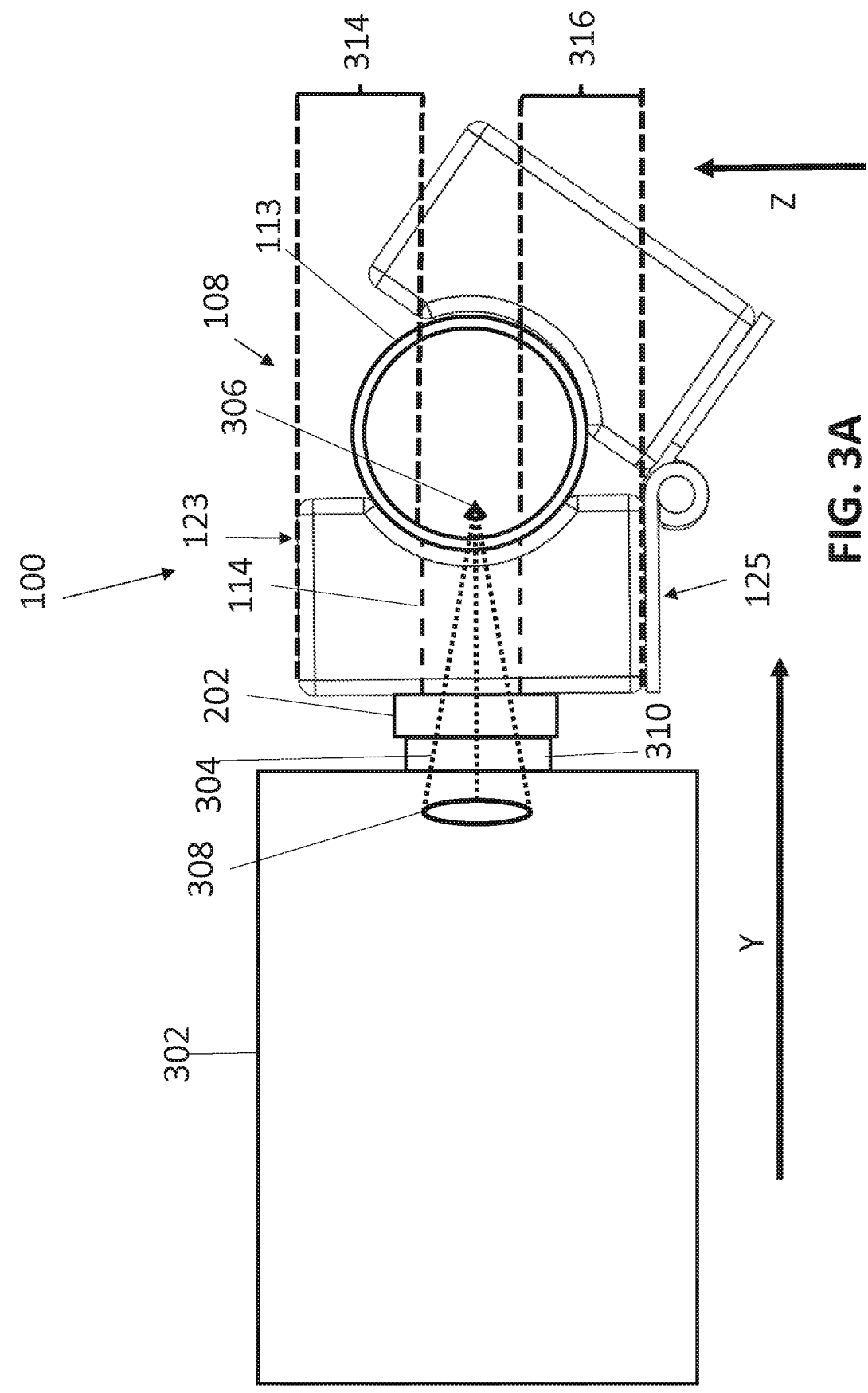
FIG. 3A shows the sample clamp 100 coupled at a spectrometer, according to some implementations.

FIG. 2 is a 3D depiction of the sample clamp 100 including an adaptor 202, according to some implementations. The adaptor 202 is configured to couple the sample clamp 100 to a spectrometer, as illustrated in FIG. 3A. The adaptor 202 is attached or positioned on an outer surface 210 of the first jaw 102 (FIG. 2). In some implementations, the adaptor 202 is formed as a part of the first jaw 102. The adaptor 202 includes a light opening 204. The light opening 204 can be a channel through the material forming the adaptor 202, or it can be a light transparent material. The light opening 204 is at least partially aligned with the conduit 114 so that the opening indicated by the circular edge 114a and the light opening 204 overlap. This allows light rays 304 to travel through the adaptor 202 and through the conduit 114 (FIG. 3A). The light rays 304 can be focused to a focal point 306 in the cylindrical object 113 by a focusing lens 308 in the spectrometer 302. Therefore, the focal point 306 is where the light rays 304 from the spectrometer 302 is focused, or scattered light returning to spectrometer 302 emanates from a sample in the cylindrical object 113.

Continuing with the description of FIG. 3A, in some implementations, the adaptor 202 is configured to couple to the sample clamp 100 at more than one distance along the second axis Y with respect to the spectrometer 302. For example, the adaptor 202 can include a thread 206 (FIG. 2) that couples to a matching thread on a nose piece 310 of the spectrometer turning the adaptor 202 relative to the nose piece moves the spectrometer 302 relative to the sample clamp 100 along the Y direction. The movement changes the focal point 306 in the Y direction. This can be helpful to avoid focusing an excitation beam at an undesirable location of the cylindrical object 113, such as wall of a test tube or syringe. Other mechanisms and elements can be used for relative movement of the spectrometer 302 to the sample clamp 100 in the Y direction. For example, a rack and pinion gear. In some implementations, the relative movement of the spectrometer 302 to the sample clamp is done manually. In some other implementations, this movement is motorized, such as by using stepper motors.

Designing the channel 114 to be about equidistant from the top 123 and the bottom 125 of the first jaw 102 was previously described. Inter alia this helps to ensure the focal point 306 is vertically centered in the cylindrical object 113. That is, when the distance 314 from the top 123 of the first jaw 102 to the conduit 114, or the distance 316 from the bottom 125 of the first jaw 102 to the conduit 114 are approximately equal, the focal point 306 is vertically centered in the container 113 because the container 113 is centered vertically. In implementations wherein the cylindrical object 113 is a container, such as a glass syringe, vertical centering minimizes any signals from the glass walls. This can ensure that the largest possible proportion of the signal from the contents of the container, rather than signal from the walls of the container or collected.

Figure 3B:
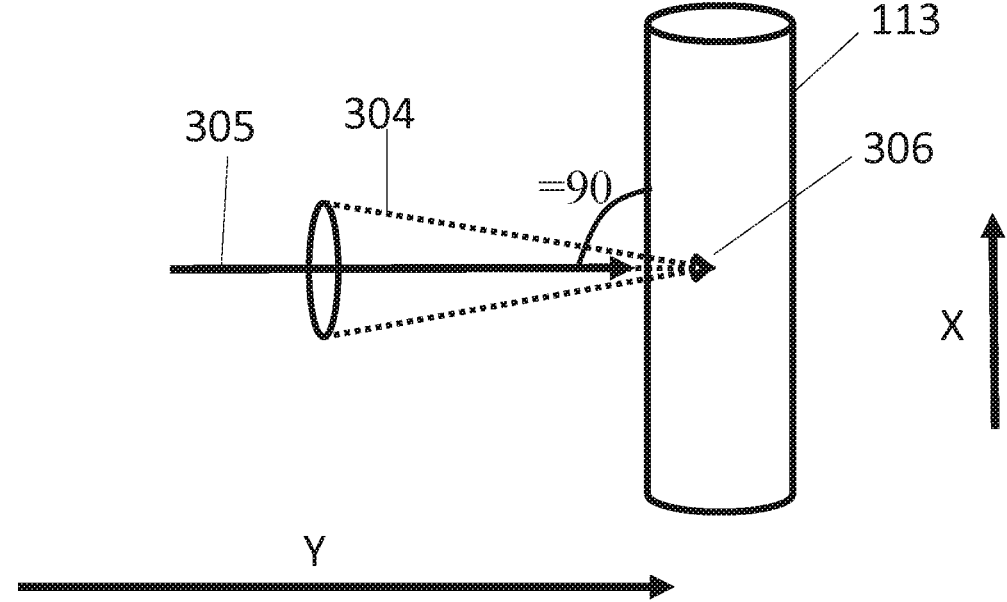
FIG. 3B shows an orientation of light entering a container, according to the implementation.

It was also earlier noted with reference to FIGS. 1A-1C, the cylindrical space 108 is oriented in the X direction, which is perpendicular to the Y and Z directions. In implementations where the cylindrical object 113 is a container, this also helps minimize any signals from the walls. FIG. 3B shows how the light rays 304 are focused such that the principal axis 305 for the light rays 304 is perpendicular to the cylindrical object 113 (i.e., angle β is about 90 degrees). For clarity, only the cylindrical object 113, the light rays 304, the principal axis 304', the lens 308 and the focal point 306 are shown in FIG. 3B.

The vertical centering feature and perpendicular incidence angle β is independent of the diameter of the cylindrical object 113, provided the second jaw 104 can contact the cylindrical object 113 when the sample clamp 100 is closed onto the cylindrical object 113. Both these features ensure there is minimal or no risk of getting a "glancing" placement of the cylindrical object 113, which would produce a larger proportion of the signal representing the walls rather than contents inside when the cylindrical object is a container. Thus, in some implementations, the focal point 306 is vertically centered and the principal access 305 of the light rays 304 are perpendicular to the cylindrical object 113.

In some implementations, the adaptor 202 is configured to detach from the spectrometer 302, so that the spectrometer 302 can be easily/reversibly separated from the sample clamp 100. In some implementations, the adaptor 202 includes a snap fitting, such as by including the features 311 separated by gaps 312 (FIG. 2), that allow flexibility to the adaptor 202 on the end contacting the nose piece 310. Other mechanisms for detachment are contemplated. For example, compressions fittings, magnetic couplings, quick-connect type fittings and mechanical latches.

Figure 4:
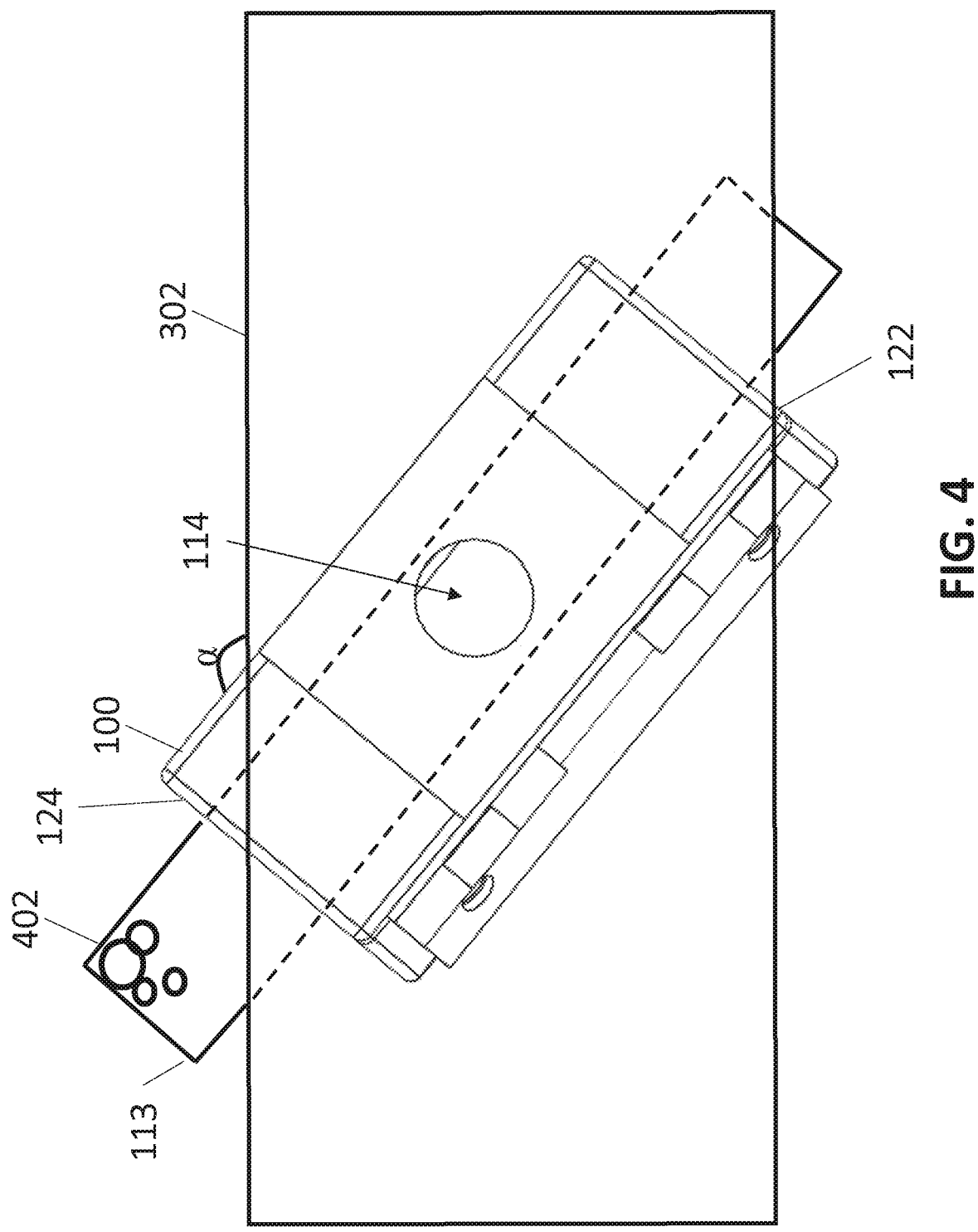
FIG. 4 shows a front view of a sample clamp coupled to a spectrometer, according to some implementations.

In some implementations, the adaptor 202 is configured to provide orientation at more than one tilt angle α of the sample clamp 100 with respect to the spectrometer 302 as illustrated by FIG. 4. This figure shows the spectrometer 302 in the foreground or top layer, and the sample clamp 100 behind the spectrometer 302 (front view tilted by angle α) holding the cylindrical object 113. Since the cylindrical object 113 is clamped by the sample clamp 100, the cylindrical object 113 is positioned so that it is oriented at the same tilt angle α. This can be advantageous in implementations such as where the cylindrical object 113 holds a fluid where air bubbles 402 can be made to migrate away from the conduit 114 and the focal point 306. Such bubble might interfere with any light entering or exiting the conduit 114. Similarly, a heterogeneous sample containing particulates can be oriented to allow settling of the particulates away from the focal point 306 using this tilt angle feature.

In some implementations, the first jaw 102 and second jaw 104 are constructed of light opaque materials. This helps provide a light tight environment in the cylindrical space 108 near the focal point 306. If a completely light tight environment is not provided, such as by light leaking in from the first end 122 or the second end 124, the choice of light opaque material will at least lessen any unwanted ambient light to reach the focal point 306. Such ambient light can cause unwanted light signals to be detected by the spectrometer 302. Locating the conduit 114 approximately equidistant (in the X direction) from the first end 122 and the second end 124 of the first jaw also help reduce any ambient light that might enter the first end 122 or the second end 124 from reaching the focal point 306.

Figures 5A, 5B, 5C:
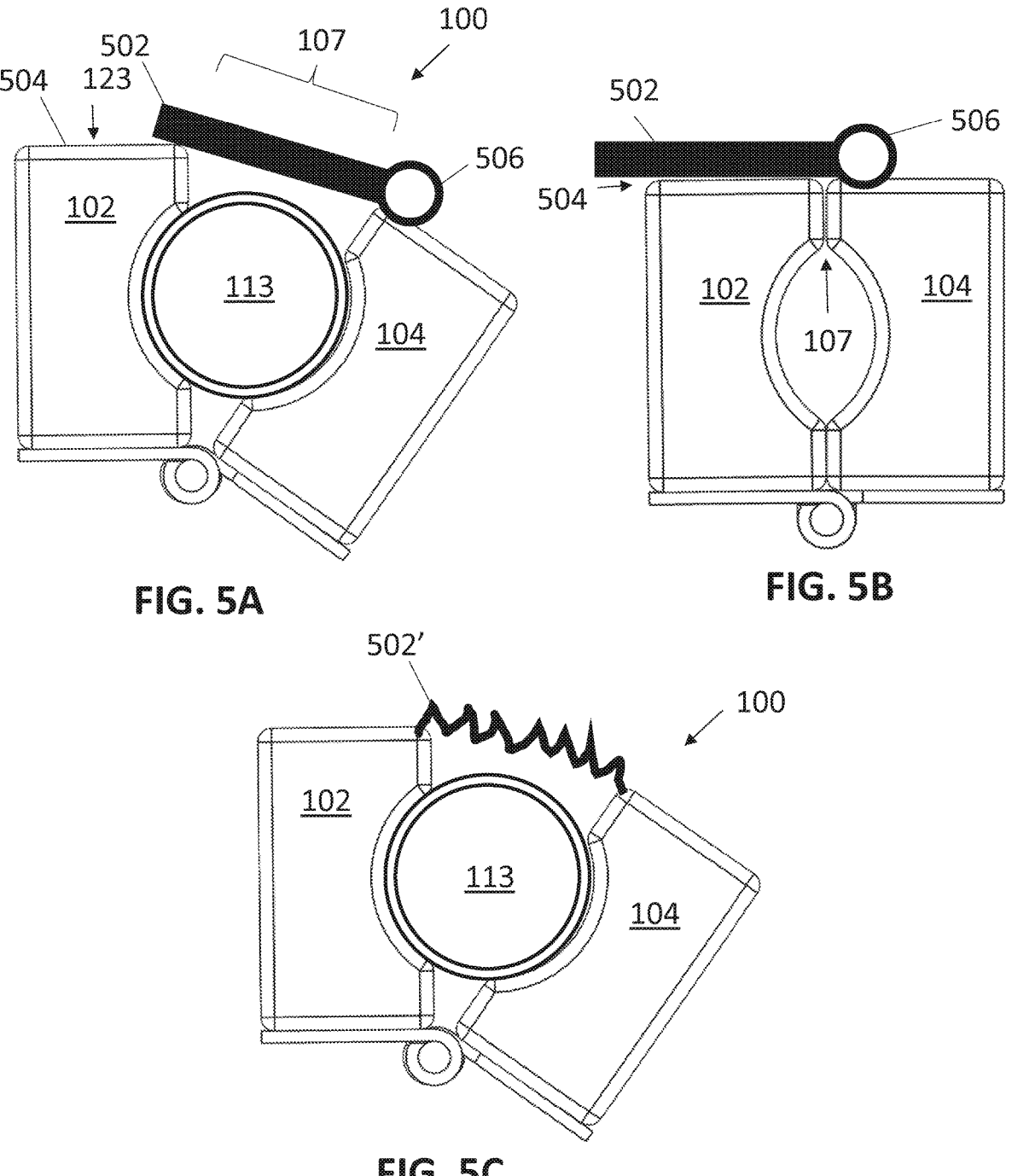
FIGS. 5A-5C show side views of a sample clamp including a lip, according to some implementations.

FIG. 5A is a side view of the sample clamp 100 with the cylindrical object 113. In this implementation, a lip 502 is included. The lip is a light barrier that spans the gap 107 and is constructed of light opaque materials. In some implementations, the lip 502 is hingedly connected to the second jaw 104 and is under tension, such as by using a spring-loaded hinge 506, and held against the outer surface 504 at the top 123 of the first jaw 102. In this implementation, the lip 502 is in contact with the outer surface 504 but not connected to the first jaw 102 so that it can slide along the outer surface 504 of the top 123. For example, as depicted in FIG. 5B, the lip 502 can slide across outer surface 504 when clamp 100 is closed. It is understood that the lip 502 can in other implementations be connected to the first jaw 102, and not connected to the second jaw 104. In other implementations, the lip can be of an accordion 502' design which is attached to both the first jaw 102 and the second jaw 104. The accordion 502', shown in FIG. 5C expands in the open configuration of the sample clamp 100, and contracts in the closed configuration of the sample clamp 100. In some implementations, the accordion 502' can also act as the tensioning element previously described. In some other implementations, the lip can be made of an elastic material which is attached to both the first jaw 102 and the second jaw 104 and which can also act as the tensioning element.

Figure 6:
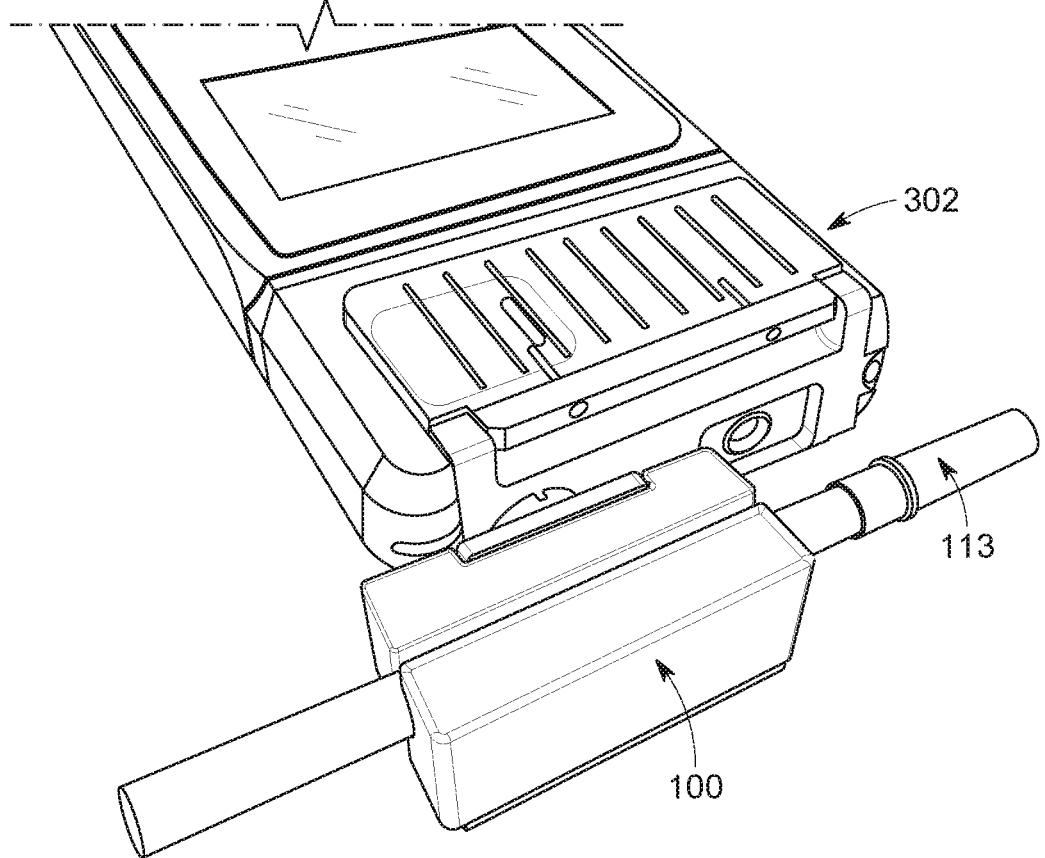
FIG. 6 shows a system for analysis of a cylindrical object, according to some implementations.

FIG. 6 shows a system 600 for analysis of a cylindrical object, according to some implementations. The system includes a spectrometer 302 and the sample clamp 100. A cylindrical object 113 is shown held by the sample clamp 100. In some implementations, the spectrometer 302 is a portable instrument, such as a handheld instrument. In some implementations, the spectrometer 302 is Raman spectrometer such as a portable Raman spectrometer.

Figure 7:
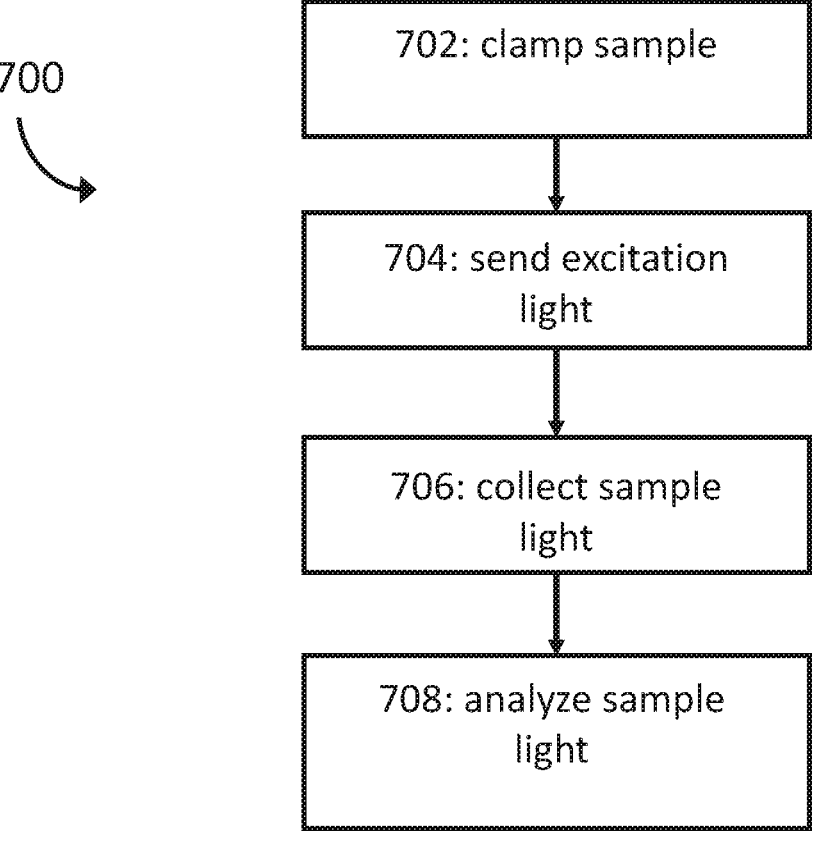
FIG. 7 is flow diagram illustrating a method for analyzing a cylindrical object, according to some implementations The figures referred to above are not drawn necessarily to scale, should be understood to provide a representation of particular embodiments, and are merely conceptual in nature and illustrative of the principals involved. The same reference numbers are used in the drawings for similar or identical components and features shown in various alternative embodiments.

FIG. 7 is flow diagram 700 illustrating a method for analyzing the cylindrical object 113, according to some implementations. In a first step, 702, the cylindrical object 113 is clamped in the cylindrical space 108 (FIG. 1A). In a second step, 704, sample light, such as from a laser in the spectrometer 302, is sent from the spectrometer 302, through the conduit 114, and into the cylindrical object 113. In a third step, 706, sample light, such as scattered light, is directed from the sample, through the conduit 114 and to the spectrometer. In a fourth step, 708, the sample light is analyzed, such as to determine the composition of a sample in the cylindrical object 113, using the spectrometer 302.

The cylindrical object 113 can be a container such as a syringe, a tube, or a cylindrical vial. In some implementations, the cylindrical object is a flow cell. In some implementations, the cylindrical object 113 is a tube carrying a sample that is a fluid or gas, such as a liquid compound, a solution, or a suspension. In some implementations, the cylindrical object 113 is the sample, such as a core sample or a frozen/solid sample. In some implementations, the cylindrical object 113 has a diameter of between 1 mm and 100 mm, such as between 5 mm and 30 mm or between about 7 mm and 15 mm.

The following numbered paragraphs 1-19 provide various examples of the embodiments disclosed herein.

Paragraph 1. A sample clamp (100) comprising: a first jaw (102) connected to a second jaw (104) by a hinge (106) oriented in a direction of a first axis (X); a substantially cylindrical space (108) oriented longitudinally in the direction of the first axis (X), defined by a first inner surface (110) of the first jaw (102) and a second inner surface (112) of the second jaw (104), and configured for clamping a cylindrical object (113) therein, and; a conduit (114) oriented in a direction of a second axis (Y) and optically connecting the cylindrical space (108) to a first outer surface (116) of the first jaw (102).

Paragraph 2. The sample clamp (100) according to paragraph 1 further comprising a tensioner holding the first jaw (102) and second jaw (104) in a closed position.

Paragraph 3. The sample clamp (100) according to paragraph 1 or paragraph 2 further comprising an adaptor (202) configured to couple the sample clamp (100) to a spectrometer (302).

Paragraph 4. The sample clamp (100) according to paragraph 3, wherein the adaptor (202) is configured to couple the spectrometer (302) to the sample clamp (100) at more than one distance along the second axis (Y).

Paragraph 5. The sample clamp (100) according to paragraph 3, wherein the adaptor (202) is configured to detachably attach the sample clamp (100) to the spectrometer (120).

Paragraph 6. The sample clamp (100) according to paragraph 3, wherein the adaptor (202) is configured to provide orientation at more than one tilt angle (α) with respect to the spectrometer.

Paragraph 7. The sample clamp (100) according to any one of paragraphs 1-6, wherein the first jaw (102) and the second jaw (104) are constructed of light opaque materials.

Paragraph 8. The sample clamp (100) according to any one of paragraphs 1-6, wherein the second jaw (104) includes a lip (502, 502').

Paragraph 9. The sample clamp (100) according to paragraph 8, wherein the lip (502, 502') contacts the first jaw (102) and the second jaw (104), thereby providing a light barrier spanning a gap (107) between the first jaw (102) and the second jaw (104).

Paragraph 10. The sample clamp (100) according to any one of paragraphs 1-9, wherein the conduit is positioned approximately equidistant from a first end (122) and a second end (124) of the first jaw (102).

Paragraph 11. The sample clamp (100) according to any one of paragraphs 1-10, wherein the conduit (114) is positioned approximately equidistant from a top (123) and a bottom (125) of the first jaw (102)

Paragraph 12. A system (600) for analysis of a cylindrical object comprising: a spectrometer (302) and a sample clamp (100) according to paragraph 1.

Paragraph 13. The system according to paragraph 12, wherein the spectrometer (302) is attached to the sample clamp (100).

Paragraph 14. The system according to paragraph 12 or paragraph 13, wherein the spectrometer (302) is a Raman spectrometer.

Paragraph 15. The system according to any one of paragraphs 12-14, wherein the spectrometer (302) includes a focusing lens (308) that focuses light to a focal point (306) in the cylindrical space (108).

Paragraph 16. A method (700) of analyzing a cylindrical object comprising: clamping the cylindrical object in the cylindrical space of the sample clamp system according to claim 11; sending excitation light from the spectrometer through the conduit and into the cylindrical object; directing a sample light from the cylindrical object through the conduit; and analyzing the sample light using the spectrometer.

Paragraph 17. The method according to paragraph 16, wherein the cylindrical object is a container containing a sample placed therein prior to clamping the sample.

Paragraph 18. The method according to paragraph 17, wherein the container is a syringe.

Paragraph 19. The method according to paragraph 17, wherein the container is a tube.

Paragraph 20. The method according to paragraph 17, wherein the container is a cylindrical vial.

Those having skill in the art, with the knowledge gained from the present disclosure, will recognize that various changes can be made to the disclosed apparatuses and methods in attaining these and other advantages, without departing from the scope of the present disclosure. As such, it should be understood that the features described herein are susceptible to modification, alteration, changes, or substitution. For example, it is expressly intended that all combinations of those elements and/or steps which perform substantially the same function, in substantially the same way, to achieve the same results are within the scope of the embodiments described herein. Substitutions of elements from one described embodiment to another are also fully intended and contemplated. The specific embodiments illustrated and described herein are for illustrative purposes only, and not limiting of that which is set forth in the appended claims. Other embodiments will be evident to those of skill in the art. It should be understood that the foregoing description is provided for clarity only and is merely exemplary. The spirit and scope of the present disclosure is not limited to the above implementation and examples but is encompassed by the following claims. All publications and patent applications cited above are incorporated by reference in their entirety for all purposes to the same extent as if each individual publication or patent application were specifically and individually indicated to be so incorporated by reference.

What is claimed is:

1. A sample clamp comprising:

a first jaw comprising a first inner surface and a first outer surface;

a second jaw comprising a second inner surface and a lip, wherein the lip contacts the first jaw and the second jaw, thereby providing a light barrier spanning a gap between the first jaw and the second jaw;

a hinge oriented in a direction of a first axis (X), the hinge connecting the first jaw to the second jaw;

wherein a clamping space defined between the first inner surface and the second inner surface is configured for clamping a cylindrical object longitudinally extending in the direction of the first axis;

a conduit extending in a direction of a second axis (Y) for optically connecting the clamping space to the first outer surface; and an adaptor configured to couple the sample clamp to a spectrometer at more than one tilt angle (α) with respect to the spectrometer.

2. The sample clamp according to claim 1 further comprising a tensioner holding the first jaw and second jaw in a closed position.

3. The sample clamp according to claim 1, wherein the adaptor is configured to couple the spectrometer to the sample clamp at more than one distance along the second axis (Y).

4. The sample clamp according to claim 1, wherein the adaptor is configured to detachably attach the sample clamp to the spectrometer.

5. The sample clamp according to claim 1, wherein the first jaw and the second jaw are constructed of light opaque materials.

6. The sample clamp according to claim 1, wherein the conduit is positioned approximately equidistant from a first end and a second end of the first jaw.

7. The sample clamp according to claim 1, wherein the conduit is positioned approximately equidistant from a top and a bottom of the first jaw.

8. A system for analysis of a cylindrical object comprising:

the spectrometer and the sample clamp according to claim 1.

9. The system according to claim 8, wherein the spectrometer is attached to the sample clamp.

10. The system according to claim 8, wherein the spectrometer is a Raman spectrometer.

11. The system according to claim 8, wherein the spectrometer includes a focusing lens that focuses light to a focal point in the clamping space.

12. A method of analyzing a cylindrical object comprising:

clamping the cylindrical object in the clamping space of the system according to claim 8;

sending excitation light from the spectrometer through the conduit and into the cylindrical object;

directing sample light from the cylindrical object through the conduit to the spectrometer; and analyzing the sample light using the spectrometer.

13. The method according to claim 12, wherein cylindrical object is a container containing a sample placed therein prior to clamping the sample.

14. The method according to claim 13, wherein the container is a syringe.

15. The method according to claim 13, wherein the container is a tube.

16. The method according to claim 13, wherein the container is a cylindrical vial.

* * * * *